(12) United States Patent  
Beversdorf

(10) Patent No.: US 7,140,263 B2
(45) Date of Patent: Nov. 28, 2006

(54) ANEMOMETER CIRCUIT

(75) Inventor: Scott Beversdorf, Brighton, MI (US)

(73) Assignee: Analog Devices, Inc., Norwood, MA (US)

( * ) Notice: Subject to any disclaimer, the term of this patent is extended or adjusted under 35 U.S.C. 154(b) by 94 days.

(21) Appl. No.: 11/031,845

(22) Filed: Jan. 6, 2005

(65) Prior Publication Data

US 2005/0150310 A1    Jul. 14, 2005

Related U.S. Application Data

(60) Provisional application No. 60/535,465, filed on Jan. 8, 2004.

(51) Int. Cl.
    *G01P 5/06*    (2006.01)
(52) U.S. Cl. .................................. 73/861.85
(58) Field of Classification Search .................. 73/204, 73/204.14, 204.15, 204.16, 28.01, 861.85
    See application file for complete search history.

(56) References Cited

U.S. PATENT DOCUMENTS

| | | | |
|---|---|---|---|
| 4,043,195 A * | 8/1977 | Hunting | 73/204.14 |
| 4,297,881 A | 11/1981 | Sasayama et al. | 73/204 |
| 4,304,128 A | 12/1981 | Hafner et al. | 73/204 |
| 4,373,387 A | 2/1983 | Nishimura et al. | 73/204 |
| 4,474,058 A | 10/1984 | Drews et al. | 73/118.2 |
| 4,487,063 A | 12/1984 | Hopper | 73/204 |
| 4,884,215 A | 11/1989 | Zboralski et al. | 364/510 |
| 4,934,188 A | 6/1990 | Tanimoto et al. | 73/204.14 |
| 5,419,187 A | 5/1995 | Uchiyama | 73/118.2 |
| 5,654,507 A * | 8/1997 | Hicks et al. | 73/204.14 |
| 6,192,740 B1 * | 2/2001 | Thomas et al. | 73/28.01 |
| 6,658,931 B1 | 12/2003 | Plumb et al. | 73/204.15 |

FOREIGN PATENT DOCUMENTS

| GB | 2138566 | 10/1984 |
|---|---|---|
| WO | WO 0161284 | 8/2001 |

* cited by examiner

*Primary Examiner*—Jewel Thompson
(74) *Attorney, Agent, or Firm*—Koppel, Patrick & Heybl

(57) ABSTRACT

An anemometer circuit comprises a sensor having a resistance which varies with temperature, immersed within a moving medium, the mass flow rate of which is to be determined. A control loop causes a current to flow through the sensor resistance, and varies the current as needed to maintain the sensor temperature at a desired value; the current is proportional to the medium's mass flow rate. In a preferred embodiment, a controller measures the sensor's voltage and current and the ambient temperature of the medium, and varies the current such that the sensor dissipates the power required to maintain its temperature at the desired value. The control loop can be arranged to maintain the sensor at a constant temperature, or at a constant differential temperature with respect to the medium's ambient temperature.

26 Claims, 3 Drawing Sheets

ANEMOMETER CIRCUIT

This application claims the benefit of provisional patent application No. 60/535,465 to S. Beversdorf, filed Jan. 8, 2004.

BACKGROUND OF THE INVENTION

1. Field of the Invention

This invention relates to the field of anemometer circuits, and particularly to hot wire anemometer circuits.

2. Description of the Related Art

One method of measuring airflow involves taking advantage of the relationship between heat dissipation and air speed. The principle of thermal anemometry relies on King's Law, which dictates that the power required to maintain a fixed differential between the surface of a heated sensor and the ambient air temperature increases as the square root of air speed.

A "hot wire" anemometer exploits this principle. A "hot wire"—typically a metallic filament—is immersed in a moving medium such as an airstream. The hot wire has a resistance which varies with its temperature, which is controlled with a current passed through the hot wire. The mass flow rate of the moving medium affects the hot wire's temperature—and thus its resistance and current—such that the current is proportional to the mass flow rate.

A basic metallic filament hot wire tends to be fragile and unreliable. However, other elements can be employed as hot wires. For example, some approaches control a current through a bipolar transistor in the airstream, with a second bipolar transistor used to sense the airstream's ambient temperature; see, e.g., *EDN* magazine, Sep. 19, 2002, pp. 104 and 106. The difference between the base-emitter voltages of the two transistors provides a measurement of flow rate. However, the transistors' gains and base-emitter voltages change over temperature; as such, the accuracy of the measured flow rate will vary with airstream temperature, and may be unacceptably large at some temperatures.

Many other approaches use a hot wire and a cold wire connected in a bridge arrangement. However, this type of configuration requires the bridge components to be well-matched if high accuracy readings are to be obtained, with extensive profiling and/or correction tables required in some cases to achieve the desired accuracy.

SUMMARY OF THE INVENTION

An anemometer circuit is presented which overcomes the problems noted above, providing accurate mass flow rate readings over a wide temperature range.

The present anemometer circuit comprises a sensor having a resistance which varies with temperature, and which is suitable for immersing within a moving medium, the mass flow rate of which is to be determined. A control loop which includes the sensor is arranged to cause a current to flow through the sensor resistance, and to vary the current as needed to maintain the sensor temperature at a desired value. The current required to do this is proportional to the medium's mass flow rate.

In a preferred embodiment, a control element, such as a transistor, is connected in series with the sensor resistance. A controller receives inputs that vary with the voltage across the sensor, the sensor current, and the ambient temperature of the medium, and operates the control element to vary the current flowing through the sensor as needed to maintain the sensor temperature at the desired value. The control loop can be arranged to maintain the sensor at a constant temperature, or at a constant differential temperature with respect to the medium's ambient temperature.

A number of variations are described, including an embodiment in which the control element itself is immersed within the moving medium, such that it also operates the sensor. The moving medium may be air, a liquid, or even solid particulates.

Further features and advantages of the invention will be apparent to those skilled in the art from the following detailed description, taken together with the accompanying drawings.

DETAILED DESCRIPTION OF THE INVENTION

Figure 1:
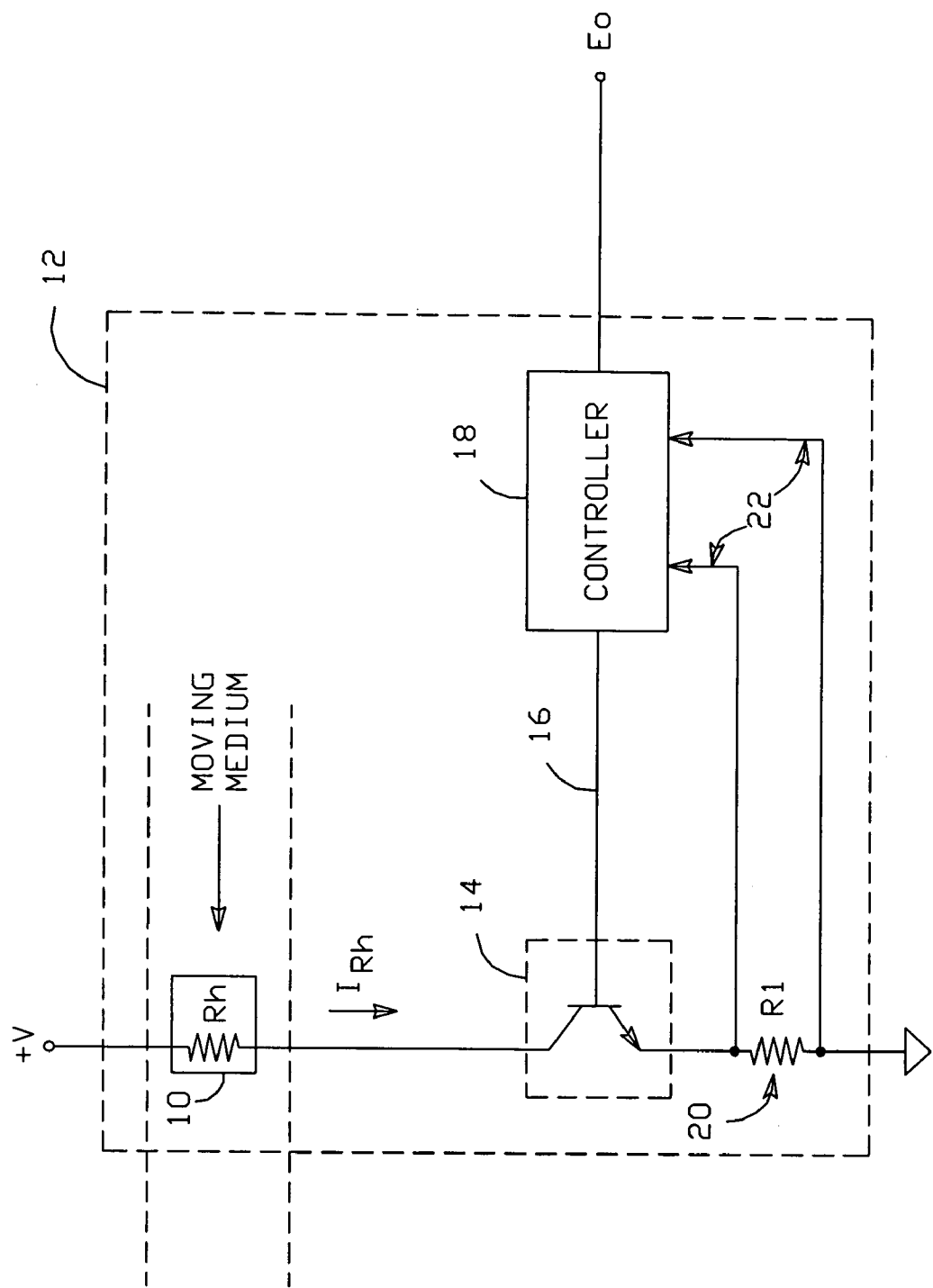
FIG. 1 is a block/schematic diagram illustrating the basic principles of an anemometer circuit per the present invention.

The basic principles of an anemometer circuit in accordance with the present invention are illustrated in FIG. 1. A sensor 10 having a resistance Rh which varies with temperature is immersed in a moving medium, the mass flow rate of which is to be determined. The temperature—and thus the resistance Rh—of sensor 10 is affected by the mass flow rate of the moving medium. A control loop 12 is arranged to cause a current $I_{Rh}$ to flow through the sensor resistance, and to vary the current as needed to maintain the temperature of sensor 10 at a desired value. Since sensor temperature is affected by the mass flow rate, the current required to maintain the temperature of sensor 10 at a desired value is proportional to the moving medium's mass flow rate.

The moving medium may be a gas such as air, a liquid, or solid particulates. Sensor 10 can be anything having a resistance that varies with temperature, such that its temperature can be controlled with a current; examples include resistance temperature detectors (RTDs), copper wires, and transistors.

Control loop 12 preferably includes a control element 14 connected in series with sensor resistance Rh, which varies $I_{Rh}$ in response to a control signal 16. A controller 18 is arranged to provide control signal 16 such that the necessary $I_{Rh}$ current is achieved. The control loop includes a means of monitoring $I_{Rh}$. In the exemplary embodiment shown, a resistor 20 having a resistance R1 is connected in series with sensor resistance Rh and control element 14—here a transistor Q1—such that the voltage across R1 varies with $I_{Rh}$. Controller 18 preferably has inputs 22 connected across R1 such that the voltage across R1 and thus current $I_{Rh}$ can be monitored. Controller 18 is arranged to produce an output Eo that varies with $I_{Rh}$, and thus with mass flow rate.

Figure 2:
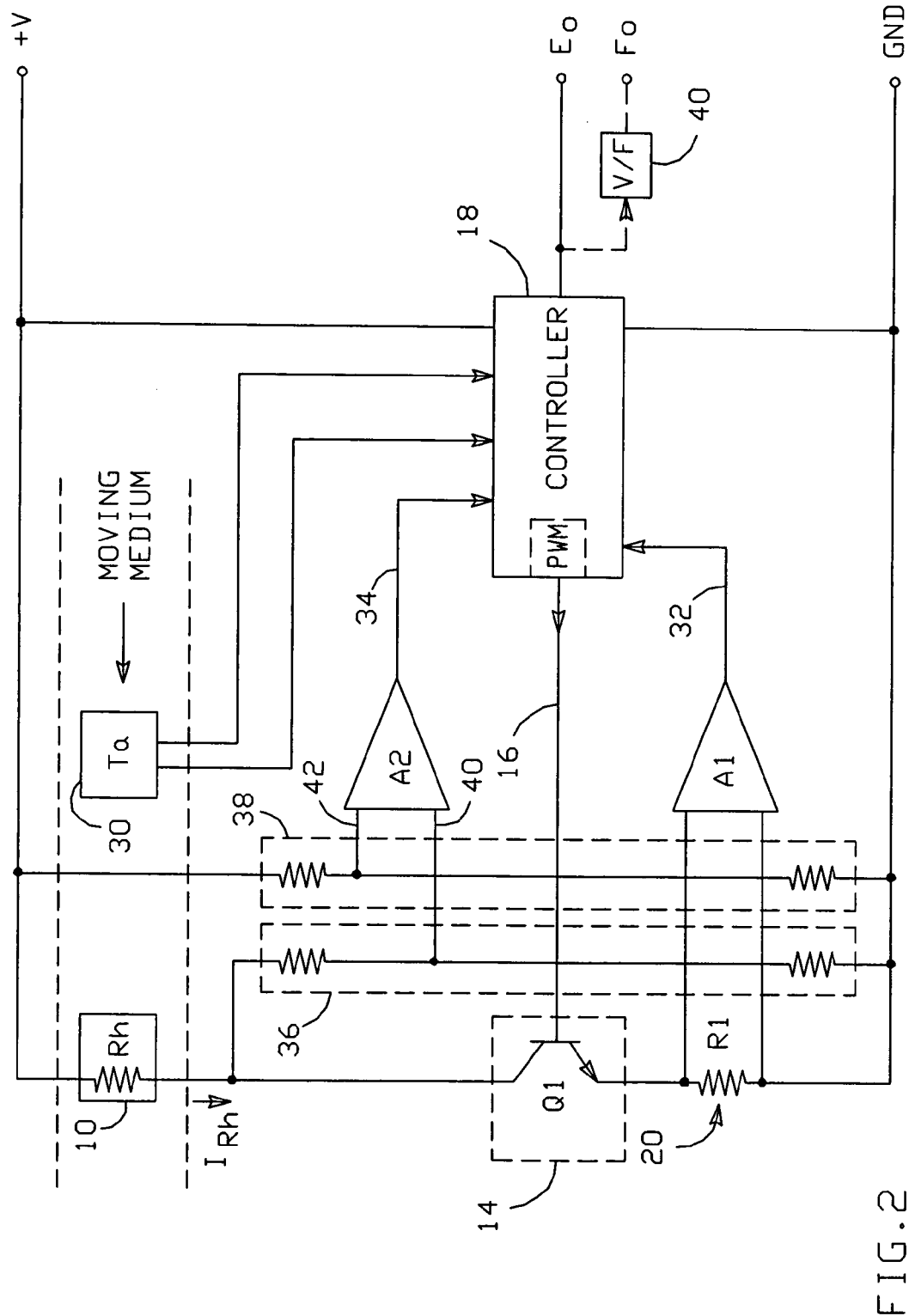
FIG. 2 is a block/schematic diagram of one possible embodiment of an anemometer circuit per the present invention.

A preferred embodiment of the invention is shown in FIG. 2. Here, the anemometer circuit includes an ambient temperature sensor 30 immersed within the moving medium along with sensor 10. The output "Ta" of temperature sensor 30 is provided to controller 18. The circuit preferably includes an amplifier A1, which has its inputs connected across resistance R1, and produces an output 32 to controller 18 which varies with the current through R1, Q1 and sensor 10. Use of amplifier A1 is preferred to provide gain and offset trim capabilities for the sensed R1 voltage, thereby improving accuracy.

Controller 18 is preferably arranged to vary the current in Rh such that sensor 10 dissipates the power required to maintain its temperature at a desired value. To determine the power dissipated by sensor 10, both the current ($I_{Rh}$) in Rh and the voltage across Rh ($E_{Rh}$) must be known. Thus, in addition to signal 32 which varies with $I_{Rh}$, controller 18 receives a signal 34 which varies with the voltage across sensor 10. Sensor resistance Rh is given by $E_{Rh}/I_{Rh}$. $I_{Rh}$ is equal to the current in R1 ($I_{R1}$), which is directly proportional to the voltage across R1 ($E_{R1}$). Therefore, $E_{Rh}$ and $E_{R1}$ signals 34 and 32 provide the information needed by controller 18 to determine the power in sensor 10. Controller 18 varies control signal 16 to cause Q1 to conduct the $I_{Rh}$ current required to dissipate the power in sensor 10 needed to maintain its temperature at the desired value. One way to accomplish this is to vary $I_{Rh}$ to make $E_{Rh}/E_{R1}$ —which is directly proportional to Rh—equal to a pre-determined constant.

In the exemplary embodiment shown, controller 18 is powered by a supply voltage +V which is also connected to the top of sensor resistance Rh. To ensure that inputs to controller 18 are within its operating range, a pair of resistive dividers 36 and 38 may be connected to either side of Rh to lower the voltages presented to controller 18. The divider outputs (40, 42) may be connected to the inputs of an amplifier A2, which provides gain and offset trim capabilities in the same fashion as A1.

Controller 18 is preferably arranged to provide an output Eo, which is given by:

$$Eo = \sqrt[4]{MF} = \frac{I_{Rh}}{\sqrt{h_{Ta}(Th - Ta)}},$$

where MF is the mass flow rate of the moving medium, Th is the temperature of sensor 10, Ta is the temperature of sensor 30, and $h_{Ta}$ is a scale factor that varies with the thermal conductivity of the moving medium, the ambient temperature (Ta) of the moving medium, and the area and convection heat transfer coefficient of sensor 10. For this embodiment, the relationship between Rh and temperature must be pre-determined, such that controller 18 can calculate Th based on Rh (=$E_{Rh}/I_{Rh}$).

The characteristics of sensor 10 are preferably tailored by the user for a particular application. For example, the power which the sensor needs to dissipate to be at the desired temperature is affected by the area of the sensor and the range over which mass flow rate is to be measured. The system voltage may also affect the choice of sensor, as a lower system voltage will limit the range of mass flow rates which can be measured.

Resistance R1 is preferably selected to keep $E_{R1}$ fairly low—preferably <0.5 volts. Allowing $E_{R1}$ to be larger increases the system voltage required to support a maximum flow rate measurement, as well as the heat R1 must dissipate.

Control element 14 is preferably either a bipolar transistor (as shown in FIG. 2) or a MOSFET. Controller 18 can be arranged such that control signal 16 operates control element transistor Q1 in its linear mode. Alternatively, control signal 16 can be pulse-width modulated (PWM), to reduce heat in Q1 or to increase efficiency.

To provide a sufficiently rapid response time, the control loop would typically be frequency compensated (not shown).

The anemometer circuit might optionally include a voltage-to-frequency converter block 40 to provide an output frequency (Fo) which varies with the measured mass flow rate.

Ambient temperature sensor 30 may be any type of device which produces an output that varies with temperature, such as a thermocouple, RTD, thermistor, or a diode. When using a diode, the diode preferably has a specified N factor, and controller 18 is preferably arranged to employ the three step current method to determine temperature. If sensor 30 is a thermocouple, controller 18 should be arranged to provide gain and offset correction. The response speed of the ambient temperature sensor is preferably faster than that of sensor 10, to minimize errors that might otherwise occur when there is a step change in mass air flow or ambient temperature.

The control loop can be arranged to operate in one of two different modes. In a "constant temperature" mode, the "desired value" of sensor 10 is a fixed temperature, and controller 18 varies current $I_{Rh}$ through Rh as needed to maintain sensor 10 at the fixed temperature. In a "constant delta temperature" mode, the "desired value" of sensor 10 is the temperature required to maintain a fixed difference between the sensor 10 temperature and the temperature sensed by ambient temperature sensor 30; here, controller 18 varies current $I_{Rh}$ through Rh as needed to maintain the fixed temperature difference. Note that the circuit arrangement shown in FIG. 2 and the Eo equation shown above are applicable for either mode—the only difference is in the specific control method.

If used in "constant temperature" mode, the temperature coefficient of sensor 10 does not matter, though an initial calibration to determine Rh at the fixed temperature may be advisable. In "constant delta temperature" mode, the circuit's power requirements may be less than for "constant temperature" mode, with a smaller delta temperature requiring less power than a larger delta temperature. However, since the temperature of sensor 10 must change, the circuit's accuracy may be less due to the temperature coefficient of Rh, and/or mismatches with the Ta sensor.

Note that control element 14 might alternatively be located above sensor 10 or below resistor 20. If placed above sensor 10, the voltage at the bottom of sensor 10 should be low enough to eliminate the need for voltage divider 36. However, placing Q1 above sensor 10 may require the circuit to be fabricated with a high voltage process, or an external voltage translator may be needed to drive Q1. Placing control element 14 below resistor 20 allows Q1 to be implemented with a large gate voltage MOSFET; however, an extra voltage divider may be needed for the low side of R1.

Also note that sensor 10 might alternatively comprise a "cold" sensor, such as a Peltier or thermoelectric cooler, rather than a "hot" sensor as described above. If so arranged, the circuit's output voltage Eo would be given by:

$$Eo = \sqrt[4]{MF} = \frac{I_{Rh}}{\sqrt{h_{Ta}(Ta - Tc)}},$$

where Tc is the temperature of the cold sensor.

Figure 3:
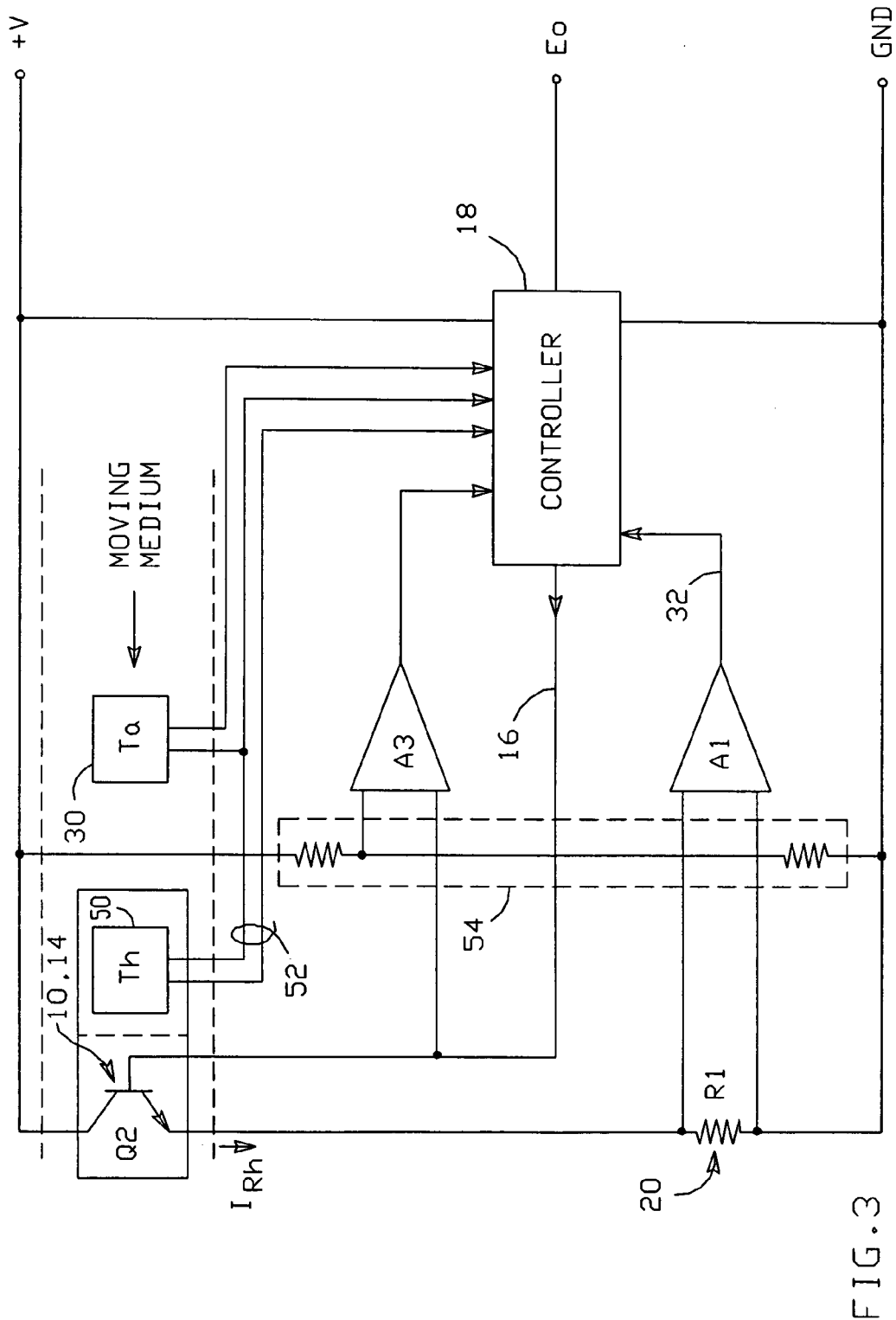
FIG. 3 is a block/schematic diagram of another possible embodiment of an anemometer circuit per the present invention.

Another possible embodiment is shown in FIG. 3, in which sensor 10 and control element 14 are both provided by a single transistor—Q2. Here, controller 18 provides control signal 16 to Q2 such that Q2 conducts the current necessary for it to be at a desired temperature value. A temperature sensor 50 is located on or near Q2, which provides an output 52 to controller 18 that varies with Q2's temperature. As before, a resistance R1 is connected in series with sensor 10 to provide a measure of the current in Q2. The voltage across Q2 is also preferably provided to controller 18, using one or more resistive dividers 54 as necessary to limit the voltages applied to the controller.

When sensor 10 is provided by transistor Q2 as shown in FIG. 3, controller 18 is arranged such that Q2 is operated in its linear mode; i.e., PWM is not used for this configuration. Using a transistor as sensor 10 is cost efficient, as a transistor is typically much less expensive than, for example, an RTD. However, this approach does require an additional temperature sensor (50), which might be implemented with, for example, another transistor or a diode. The design is power efficient: in FIGS. 1 and 2, power is lost due to heat dissipated by Q1; here, however, no power is lost in the control element. Note, however, that the mass of Q2 may be larger than that of an RTD; as such, its thermal response is likely to be slower, which could introduce some inaccuracy into the mass flow rate measurement.

As with the configurations discussed above, the FIG. 3 arrangement could be operated in either constant-temperature or constant-delta-temperature modes, with the Eo equation above applicable in either case.

The circuit arrangements shown and described herein are merely exemplary; an anemometer circuit in accordance with the present invention could be implemented in many different ways.

While particular embodiments of the invention have been shown and described, numerous variations and alternate embodiments will occur to those skilled in the art. Accordingly, it is intended that the invention be limited only in terms of the appended claims.

I claim:

1. An anemometer circuit, comprising:
   a first sensor having a resistance which varies with temperature and is suitable for immersing within a moving medium, the mass flow rate of which is to be determined;
   a control loop which includes said first sensor, said loop arranged to cause a current to flow through said first sensor resistance and to vary said sensor current to maintain said first sensor temperature at a desired value, said sensor current being proportional to said mass flow rate;
   a control element connected in series with said first sensor resistance which varies said sensor current in response to a control signal;
   a controller which receives inputs that vary with the voltage across said first sensor resistance and the current through said first sensor resistance, said controller arranged to provide said control signal as needed to vary said sensor current such that said first sensor dissipates the power required to maintain said first sensor temperature at said desired value.

2. The anemometer circuit of claim 1, wherein said moving medium is a gas and said current is proportional to the mass flow rate of said gas.

3. The anemometer circuit of claim 1, wherein said moving medium is a liquid and said current is proportional to said liquid's mass flow rate.

4. The anemometer circuit of claim 1, wherein said moving medium is solid particulates and said current is proportional to the mass flow rate of said solid particulates.

5. The anemometer circuit of claim 1, wherein said control element is a transistor.

6. The anemometer circuit of claim 5, wherein said transistor is a bipolar transistor or a MOSFET.

7. The anemometer circuit of claim 1, wherein said controller is arranged to pulse-width modulate said control signal.

8. The anemometer circuit of claim 1, wherein said controller is arranged to provide a linear control signal.

9. The anemometer circuit of claim 1, further comprising a resistor connected in series with said first sensor resistance, said controller including an input which varies with the voltage across said resistor and thus the current through said first sensor resistance.

10. The anemometer circuit of claim 1, wherein said control loop is arranged to vary said sensor current to maintain said first sensor temperature at a fixed value.

11. The anemometer circuit of claim 1, further comprising a second sensor which provides an output which varies with the ambient temperature of said moving medium.

12. The anemometer circuit of claim 11, wherein said control loop is arranged to vary said sensor current to maintain the difference between the temperature represented by said first sensor's resistance and said ambient temperature at a fixed value.

13. The anemometer circuit of claim 11, wherein said second sensor is a thermocouple, a thermistor, or a diode.

14. The anemometer circuit of claim 1, wherein said first sensor is a resistance temperature detector (RTD) or a wire.

15. An anemometer circuit, comprising:
   a first sensor having a resistance which varies with temperature and is suitable for immersing within a moving medium, the mass flow rate of which is to be determined;
   a second sensor which provides an output which varies with the ambient temperature of said moving medium;
   a control loop which includes said first sensor, said loop arranged to cause a current to flow through said first sensor resistance and to vary said sensor current to maintain said first sensor temperature at a desired value;
   said sensor current being proportional to said mass flow rate;
   wherein said control loop includes a control element connected in series with said first sensor resistance which varies said sensor current in response to a control signal, further comprising a controller which receives the output of said second sensor and inputs that vary with the voltage across said first sensor resistance and the current through said first sensor resistance, said controller arranged to provide said control signal such that said first sensor dissipates the power required to maintain said first sensor temperature at said desired value.

16. The anemometer circuit of claim 15, wherein said controller is arranged to provide an analog output voltage Eo which is proportional to said mass flow rate, given by:

$$Eo = \frac{I_s}{\sqrt{h_{T_a}(T_h - T_a)}},$$

where $I_s$ is said current flowing through said first sensor resistance, $h_{Ta}$ is a scale factor that varies with the thermal conductivity of the moving medium, the ambient temperature $T_a$ of said moving medium, the area of said first sensor and the convection heat transfer coefficient of said first sensor, and $T_h$ is the temperature $T_h$ of said first sensor.

17. An anemometer circuit, comprising:
a first sensor having a resistance which varies with temperature and is suitable for immersing within a moving medium, the mass flow rate of which is to be determined;
a control loop which includes said first sensor, said loop arranged to cause a current to flow through said first sensor resistance and to vary said sensor current to maintain said first sensor temperature at a desired value;
said sensor current being proportional to said mass flow rate;
wherein said first sensor is a first transistor which conducts said sensor current in response to a control signal, further comprising a controller arranged to provide said control signal.

18. The anemometer circuit of claim 17, further comprising a temperature sensor arranged to sense the temperature of said first transistor and provide an output to said controller which varies with said sensed temperature.

19. The anemometer circuit of claim 18, wherein said temperature sensor is a diode or second transistor.

20. An anemometer circuit, comprising:
a first sensor having a resistance which varies with temperature and is suitable for immersing within an airstream, the mass air flow (MAF) rate of which is to be determined;
a second sensor which provides an output which varies with the ambient temperature of said airstream;
a control loop, comprising:
said first sensor resistance,
a control element connected in series with said first sensor resistance which conducts a current that flows through said first sensor resistance in response to a control signal, and
a controller which receives the output of said second sensor and inputs that vary with the voltage across said first sensor resistance and the current through said first sensor resistance, said controller arranged to provide said control signal such that said first sensor dissipates the power required to maintain said first sensor temperature at a desired value;
said sensor current being proportional to said MAF rate.

21. The anemometer circuit of claim 20, wherein said control loop is arranged to vary said sensor current to maintain said first sensor temperature at a fixed value.

22. The anemometer circuit of claim 20, wherein said control loop is arranged to vary said sensor current to maintain the difference between the temperature represented by said first sensor's resistance and said ambient temperature at a fixed value.

23. The anemometer circuit of claim 20, further comprising a resistor connected in series with said control element and said first sensor resistance, said controller including an input which varies with the voltage across said resistor and thus the current through said first sensor resistance.

24. An anemometer circuit, comprising:
a first sensor having a resistance which varies with temperature and is suitable for immersing within an airstream, the mass air flow (MAF) rate of which is to be determined;
a second sensor which provides an output which varies with the ambient temperature of said airstream;
a control loop, comprising:
said first sensor resistance,
a control element connected in series with said first sensor resistance which conducts a current that flows through said first sensor resistance in response to a control signal, and
a controller which receives the output of said second sensor and inputs that vary with the voltage across said first sensor resistance and the current through said first sensor resistance, said controller arranged to provide said control signal such that said first sensor dissipates the power required to maintain said first sensor temperature at a desired value;
said sensor current being proportional to said MAF rate;
wherein said controller is arranged to provide an analog output voltage Eo which is proportional to said mass flow rate, given by:

$$Eo = \frac{I_s}{\sqrt{h_{Ta}(T_h - T_a)}},$$

where $I_s$ is said current flowing through said first sensor resistance, $h_{Ta}$ is a scale factor that varies with the thermal conductivity of said airstream, the ambient temperature $T_a$ of said airstream, the area of said first sensor and the convection heat transfer coefficient of said first sensor, and $T_h$ is the temperature $T_h$ of said first sensor.

25. An anemometer circuit, comprising:
a first sensor having a resistance which varies with temperature and is suitable for immersing within an airstream, the mass air flow (MAF) rate of which is to be determined;
a second sensor which provides an output which varies with the ambient temperature of said airstream;
a control loop, comprising:
said first sensor resistance,
a control element connected in series with said first sensor resistance which conducts a current that flows through said first sensor resistance in response to a control signal, and
a controller which receives the output of said second sensor and inputs that vary with the voltage across said first sensor resistance and the current through said first sensor resistance, said controller arranged to provide said control signal such that said first sensor dissipates the power required to maintain said first sensor temperature at a desired value;
said sensor current being proportional to said MAF rate;
wherein said control element is said first sensor, further comprising a temperature sensor arranged to sense the temperature of said control element and provide an output to said controller which varies with said sensed temperature.

26. An anemometer circuit, comprising:
a first sensor having a resistance which varies with temperature and is suitable for immersing within an airstream, the mass air flow (MAF) rate of which is to be determined;
a second sensor which provides an output which varies with the ambient temperature of said airstream;

a control loop, comprising:
  said first sensor resistance,
  a control element connected in series with said first sensor resistance which conducts a current that flows through said first sensor resistance in response to a control signal, and
  a controller which receives the output of said second sensor and inputs that vary with the voltage across said first sensor resistance and the current through said first sensor resistance, said controller arranged to provide said control signal such that said first sensor dissipates the power required to maintain said first sensor temperature at a desired value;
said sensor current being proportional to said MAF rate;
wherein said controller is powered with a predetermined supply voltage, said anemometer circuit further comprising one or more resistive dividers connected to respective sides of said first sensor resistance to limit the voltages presented to said controller for determining the voltage across said first sensor resistance.

* * * * *